United States Patent [19]

Nordskog

[11] 4,209,163
[45] Jun. 24, 1980

[54] DUMP VALVE ASSEMBLY

[76] Inventor: Robert A. Nordskog, 18135 Karen Pl., Tarzana, Calif. 91356

[21] Appl. No.: 868,813

[22] Filed: Jan. 12, 1978

[51] Int. Cl.² ............................................ F16K 35/00
[52] U.S. Cl. ..................... 251/96; 220/236; 137/351; 251/144; 251/189; 251/269; 138/92
[58] Field of Search ............... 251/144, 184, 191, 269, 251/368, 96; 138/89, 92, 93, 94, 94.3; 137/347, 351; 220/235, 236, 237

[56] References Cited

U.S. PATENT DOCUMENTS

| | | | |
|---|---|---|---|
| 1,850,040 | 3/1932 | Turner | 220/235 X |
| 1,917,936 | 7/1933 | Hartman | 251/144 X |
| 2,108,068 | 2/1938 | Larry | 138/94 X |
| 2,566,816 | 9/1951 | Work | 220/235 X |
| 2,867,243 | 1/1959 | Bowan | 220/235 X |
| 3,348,567 | 10/1967 | Volpin | 251/269 X |
| 3,416,769 | 12/1968 | Brigaudi | 251/189 |
| 3,473,555 | 10/1969 | Martin | 251/189 X |
| 3,777,783 | 12/1973 | Beck | 251/368 X |
| 3,796,228 | 3/1974 | Bedo | 251/368 X |
| 3,841,355 | 10/1974 | Lauer | 138/93 X |

*Primary Examiner*—Harold W. Weakley
*Attorney, Agent, or Firm*—Matthew P. Lynch

[57] ABSTRACT

A dump valve assembly for opening and fluid-tightly sealing the drain outlet of a waste tank, the assembly comprisng a rotatable elongated shaft having a handle at its upper end and a first or lower compression plate adjustably secured to its lower end. Disposed concentrically about the shaft are a first and second tubular member, the former having a length less than that of the shaft, and the latter having a length less than that of the first tubular member. Fixedly secured to the lower end of the first tubular member is a second or upper compression plate spaced from the lower plate. Sandwiched and pre-loaded between the upper and lower compression plates is a valve plug made of an expandable material. The shaft is provided with a double-thrust ball bearing which abuttingly engages the upper end of the first tubular member to permit independent rotation of the shaft relative to the former member. The threaded lower end of the shaft meshes with the inner threading of a hub formed integrally with the lower compression plate, in upright orientation relative thereto. Typically, the lower end portion of the shaft extends beyond the undersurface of the lower compression plate and a roll pin extends through the projecting lower shaft portion to retain the lower compression plate on the shaft during rotation of the latter. As a result of the pre-load of the plug, the lower compression plate will ride upwardly on the shaft threaded lower end thereby to expand the plug when the shaft is rotated in clockwise direction. Conversely, when the shaft is rotated in counterclockwise direction, the plug, on account of its expanded condition will urge the lower compression plate downwardly due to contraction of the plug to its normal size. The outer periphery of the plug is provided with a plurality of ribs which effect a positive seal with the drain outlet in expanded condition of the plug. The upper end of the first tubular member is formed with a narrow sleeve, the latter having a downwardly oriented finger which, during operation of the valve assembly, is received and accommodated in a downwardly extending, open-ended slot in the upper end of the second tubular member. This arrangement prevents rotation of the first tubular member relative to the second one. Secured to the second tubular member is a mounting plate for securing the assembly to the waste tank. Hence, during operation, both the first and second tubular members are stationary while rotation of the shaft causes expansion or contraction of the plug depending upon the rotation direction of the shaft.

5 Claims, 4 Drawing Figures

DUMP VALVE ASSEMBLY

BACKGROUND OF THE INVENTION

1. Field of the Invention

The present invention, in general, relates to valve assemblies for the opening and closing of outlets and relates more particularly to a dump valve assembly adapted especially for use in combination with the drain outlet of a vehicle waste tank such as, for example, a lavatory holding tank.

2. Prior Art

Already known in the art are holding tank drainage systems for the removal of waste or sewage from, for instance, a lavatory holding tank used on a variety of vehicles such as aircraft, locomotives, lavatory service trucks, and the like. Typically, these systems invariably utilize stoppers or plugs to hermetically seal the drain or waste outlet prior to or following waste removal and flushing of the holding tank. It will be appreciated that in order to allow the waste tank to be serviced the stopper or plug will first have to be removed from the outlet, the latter usually including an integral nipple assembly which is coupled to a drain hose, or the like, during the emptying process of the tank. Removal of the stoppers or plugs, typically, is accomplished by means of mechanical equipment which engages the stopper or plug, preferably without the spilling of waste, and without any possible personal contact therewith.

The holding tank drain systems which are currently widely in use utilizes a nipple assembly formed integrally with the bottom of the waste or sewage holding tank and, depending upon the given construction of the nipple, i.e., a flanged or flangeless nipple, a cap or drain plug is employed to prevent waste or sewage leakage from the holding tank. To remove the cap or drain plug, a drain coupling is used. The drain coupling incorporates a nipple contacting portion and a handle which is keyed for engagement with the cap or plug to dislodge these sealing members from the nipple assembly. A special by-pass channel is provided in the coupling which enables the waste or sewage to be discharged from the tank via, for an example, by a hose coupled to the by-pass channel. A conventional drain coupling is, for instance, a Y-drain coupling which comprises a handle secured to an elongated shaft which is keyed to mate with a slot provided in the cap or plug. Upon engagement with the keyed shaft end and the slotted cap or plug, the handle is withdrawn which removes the cap or plug from the nipple, the latter remaining on the keyed shaft end for subsequent repositioning of the cap or plug following waste removal and cleaning of the tank. Upon dislodgement of the cap or plug from the nipple, the waste or sewage is drained from the tank via the drain "Y" fitting, the latter being coupled to a hose, pipe, or the like, by means of a special coupling assembly detachably mounted on the drain. Following waste removal and flushing of the tank, the shaft is raised and the cap or plug is repositioned on or in the nipple opening. Subsequently, the drain coupling is removed from the nipple assembly.

Although the above-discussed system provides a no-contact and no-spill waste removal arrangement tank, it will be appreciated that this system is complicated as regards the required manual operations to connect the drain coupling, to remove the cap or plug, to reposition the latter sealing members, and to again remove the drain coupling. Moreover, this type of coupling is uneconomical with regard to its construction, maintenance, parts, and manufacture.

SUMMARY OF THE INVENTION

Object of the present invention is to overcome the above-mentioned disadvantages and to provide a dump valve assembly which is simple and economical to manufacture, uncomplicated as regards its parts, construction, and operation, and easy to operate.

It is a further object of the invention to provide a novel dump valve assembly which enables the drain outlet of a waste or sewage holding tank to be selectively opened and/or fluid-tightly sealed and which is manually-operated, permanently installed, and requires little or no maintenance at all.

Such a dump valve assembly in accordance with the invention essentially comprises an elongated rotatable shaft which, at its upper end, is provided with a handle assembly for imparting rotary motion to the shaft and which, at its lower end, is arranged with a lower compression plate. The lower end portion of the shaft is threaded while the lower compression plate is formed with an annular upright hub member having an inner thread which meshes with the threaded end portion of the shaft and, which upon rotation of the latter, enables the lower plate to be raised and lowered relative to the shaft. Disposed concentrically about the shaft are a first and second tube, the first tube having a length less than that of the shaft while the second outer tube is shorter in length than the first tube. The second or outer tube is provided with an integral mounting plate for securing the valve assembly to the holding tank, for instance, to the top of the tank. The upper ends of the first and second tubes both are formed with interlocking members in the form of a locking finger on the first tube upper end and a locking indent in the second or outer tube upper end, the finger mating with the indent to prevent rotation of the first tube relative to the second one when rotatary motion is imparted to the shaft by the handle assembly. The shaft, adjacent its upper end, is provided with a double-thrust ball bearing which, during operation of the assembly, abuttingly engages the upper end of the first tube and permits independent rotation of the shaft relative to the first tube, the latter already being locked against rotation with the outer tube. Formed integrally with the lower end of the first tube is an upper compression plate which is spaced from the lower one. Pre-loaded between the upper and lower compression plates is an annular, donut-shaped expandable plug. Positioning of the plug may be adjusted by means of tensioning washers disposed at the lower most end portion of the shaft which extends below the undersurface of the lower compression plate. In addition, a roll or retainer pin extend transversely through this projecting shaft end portion to maintain the lower compression plate on the lower shaft end during rotation of the shaft. A guide member projects downwardly from the lower surface of the lower compression plate to properly guide the plug into position within the drain outlet prior to expansion of the plug. The plug is caused to expand when the handle and, thereby, the shaft is rotated in clockwise direction and to contract to its normal size when the handle is moved in counterclockwise direction. Due to the given lengths of the first and second tubes with regard to the longer length of the shaft, the latter, during operation of the assembly and with the plug in its contracted condition, is raised to enable drainage of the waste or sewage from the tank. In the raised position of the shaft, the handle is pivoted downwardly from a horizontal position to a substantially vertical position and is locked in this position during drainage and subsequent flushing of the tank. Following such drainage and flushing, the handle is restored to its horizontal position, the shaft is lowered and the plug, guided into the drain outlet, is expanded to fluid-tightly seal the outlet.

The above and other objects of the invention will be more readily understood from the following description when considered in connection with the accompanying drawings, in which:

BRIEF DESCRIPTION OF THE DRAWINGS

FIG. 3 is a fragmentary view, illustrating the valve plug in contracted condition and the manner in which same is pre-loaded and retained on the shaft.

DESCRIPTION OF THE PREFERRED EMBODIMENT

Figure 1:
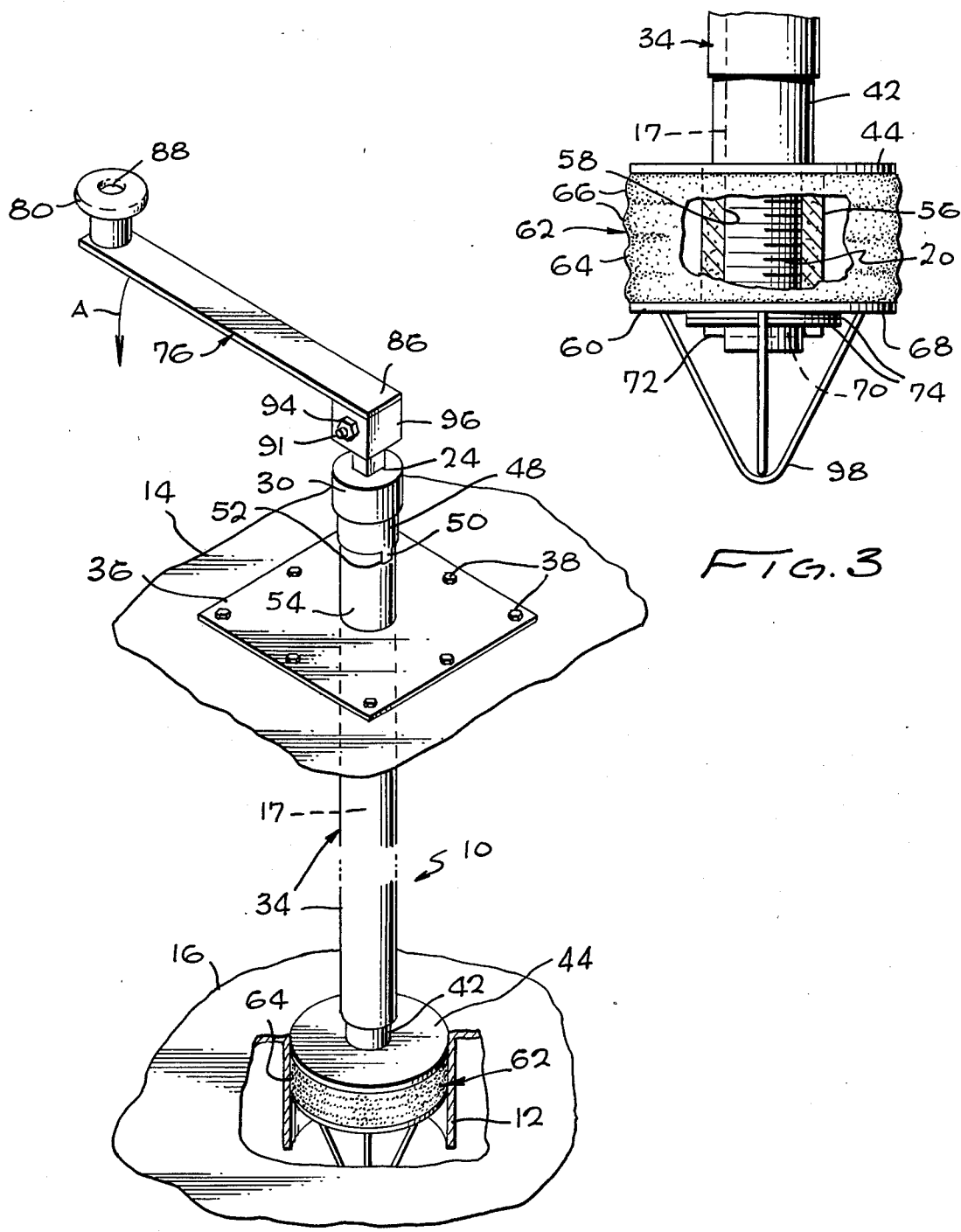
FIG. 1 is a perspective view of the dump valve assembly in accordance with the invention, illustrating the valve plug in expanded condition in the drain outlet of a holding tank.
Figure 2:
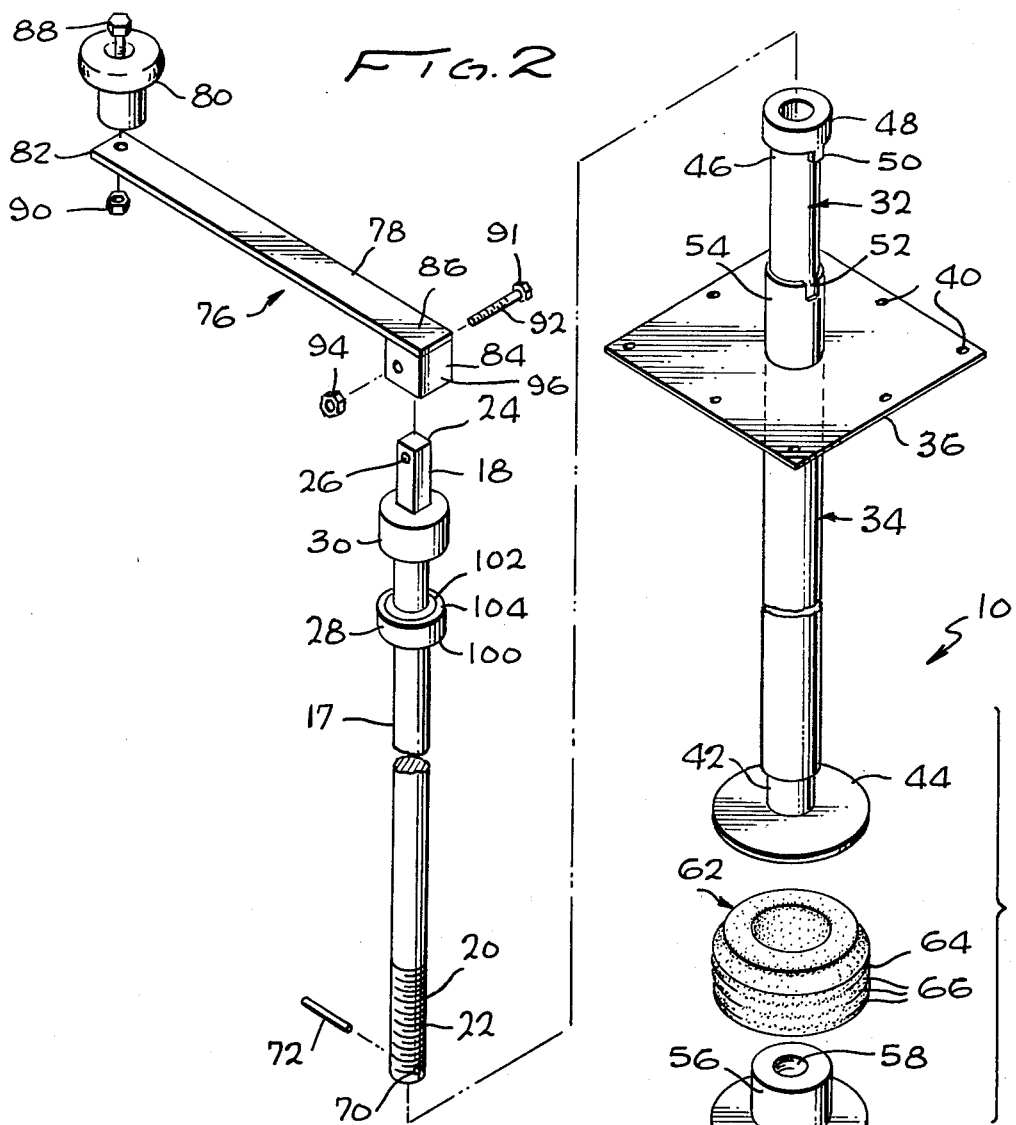
FIG. 2 is an exploded plan view of the dump valve assembly of FIG. 1.

Referring now to the drawings in which like reference numerals index like parts, and with attention initially directed to FIGS. 1 and 2, there is shown a dump valve assembly, referenced generally by the numeral 10, and adapted especially for use with the drain outlet 12 of a holding tank, the upper and lower surfaces of which are referenced by the numerals 14, 16, respectively, FIG. 1.

The valve assembly 10 is seen to comprise an elongated center shaft 17 having an upper end portion 18, and a lower end portion 20, provided with thread 22, e.g., ACME thread. The uppermost end 24 is squared and is formed with an opening 26 which extends through the end 24 normal to the axis of the shaft. Directly below the end 24 is an anti-friction ball bearing 28 enclosed by a cover 30 formed integrally with shaft 17, the cover being provided to prevent water and dirt from entering the bearing. As will be appreciated, the bearing is designed to resist thrust, i.e., loads acting in the axial direction of the shaft and, in addition, ensure a long service life and require a low lubricant consumption. The bearing 28 resists thrust in both directions.

Disposed concentrically about shaft 17 are a first tubular member 32 having a length less than shaft 17, and a second or outer tubular member 34, the latter being shorter in length than the first tubular member 32. Typically, shaft 17 is 3″ or slightly more than 3″ longer than first tubular member 32 while the latter may vary in length from about 6″–15″ longer than outer tubular member 34.

Formed integrally with outer tubular member 34, i.e., by welding, is a mounting plate 36 which, as shown in FIG. 1, is secured by bolt members 38 to the upper tank surface 14 via openings 40, FIG. 2, formed in plate 36. It should be noted that in mounting the assembly 10 in the holding tank, shaft 17 must be aligned with drain outlet 12, for reasons as will be explained hereinafter. As shown in FIG. 1, upon mounting the assembly to the holding tank, the shaft 17 and tubular members 32, 34, extend vertically between the surfaces 14, 16 of the tank.

The lower end 42 of inner tubular member 32, is formed integrally, i.e., by welding, with an upper compression plate 44. Compression plate 44, as shown, is in the form of an annular, disc-shaped member which permits passage of shaft 17 therethrough. The upper end 46 of member 32 is formed integrally with a narrow sleeve 48 having a downwardly oriented finger 50. Mating with finger 50 is a downwardly extending, open-ended slot or indent 52 formed in the upper end 54 of tubular member 34. In operation of the assembly 10, the finger 50 is received and retained in slot 52, thereby preventing rotation of tubular member 32 relative to tubular member 34. By the formation of sleeve 48 on upper end 46 of tubular member 32, upper end 46 is substantially widened which, as a result, constitutes a positive bearing or contact surface for bearing 28 upon insertion of shaft 17 in tubular member 32.

Threadedly secured to lower threaded end 20 is an annular stub member 56 having inner thread 58, e.q., ACME thread, formed therein, FIG. 2. Formed integrally with annular stub member 56 is a second or lower compression plate 60, the latter being in the form of an annular disc-shaped member permitting passage of the shaft lower end 20 therethrough. Both the upper and lower compression plates 44, 60 are similar in configuration. Preloaded and sandwiched between the compression plates 44, 60, FIG. 1, is an expandable donut-shaped plug 62 made of a suitable expandable and contractible material such as a rubber or plastic material. The outer peripheral surface 64 of plug 62 is provided with a plurality of ribs 66 which provide for a fluid-tight seal with drain outlet 12 upon insertion and expansion of plug 62 in the outlet, FIGS. 1 and 3.

As clearly shown in FIG. 3, the lower threaded end 20 of shaft 17 extends or projects beyond lower face 68 of lower compression plate 60. Formed in the lower shaft end 20 is a transverse passage 70 through which a roll pin 72 is applied to retain lower compression plate 60 on shaft end 20. Interposed between pin 72 and lower face 68 of compression plate 60, are a plurality of washers 74, FIG. 3, which, on the one hand, prestress the plug 62 between compression plates 44, 60, and which, on the other hand, prevent the roll pin 72 from damaging the lower face 68 of compression plate 60. The number of washers 74 to be employed depends on the desired pre-load to be applied to plug 62.

Detachably secured to uppermost end 24 of shaft 17 is a handle assembly 76 and which is seen to include a handle bar 78, a knob 80 at the free end 82 of the handle bar and a three-sided cage-shaped attachment member 84 at the inner end 86 of bar 78. The knob 80 is detachably secured to handle bar 78 by a conventional bolt and nut arrangement 88, 90. The open-ended cage-shaped attachment member is open in direction of handle bar 78 so as to enable the latter to be swivelled or pivoted, arrow A, FIG. 1, from the horizontal to a substantially vertical position when the assembly 10 is in operation and shaft 17 is raised relative to tubular members 32, 34. Pivoted movement of the handle assembly 76 is enabled by means of a pivot point constituted by a pin 91 extending through cage 84 and passage 26 at uppermost end 24 of shaft 17. The bolt 91 is formed with thread 92, FIG. 2, and is retained in position by a nut 94. A backplate 96 of attachment member 84 serves as a stop for the handle bar when the latter is restored to its horizontal position.

Lower face 68 of lower compression plate 60 is formed with a downwardly directed guide member 98, the latter being in the form of an open cage-type conical member. As will be appreciated, guide member 98 serves to properly guide plug 62 into position within drain outlet 12, FIG. 1.

Due to the smaller lengths of first and second tubular members 32, 34, relative to the greater length of shaft 17, the latter, in contracted condition of plug 62, is raised, enabling the waste or sewage to be discarded from the holding tank via outlet 12. In this condition, also plug 62 is raised and totally dislodged from outlet 12, so as not to obstruct the discharge of the tank contents. In raised position of shaft 17, handle assembly 76 is swivelled downwardly from its horizontal position to a substantially vertical position, means (not shown) being provided to hold the handle assembly in the vertical position. Following draining and subsequent flushing of the holding tank, the handle assembly is restored into its horizontal position, shaft 17 is lowered, and plug 62, guided into drain outlet 12, is expanded to fluid-tightly seal outlet 12.

The preload of plug 62 provided by washers 74 serves as a "pick-up" to enable lower compression plate 60 to "ride" up- and downwardly relative to lower shaft end portion 20, depending upon the rotation direction of shaft 17. Typically, plug 62 is caused to expand when the handle assembly and, thereby, shaft 17 is rotated in clockwise direction, and to contract to its given prestressed dimension when handle assembly 76 is moved in counter-clockwise direction.

Also, during expansion operation of plug 62, the inner race, not shown, at the underside 100 of bearing 28 abuttingly engages the bearing surface of sleeve 48 at the uppermost end 46 of tubular member 32, in which condition this inner race of the bearing is stationary with the end 46 of non-rotating tubular member 32. The inner race 102 at the upper side 104 of bearing 28 is rotatable with shaft 17.

Typically, the valve assembly 10 is made of stainless steel with the exception of lower compression plate 60 and hub 56, the latter two elements being made of brass which provides for a better bearing surface and longer life between the threaded lower end 20 and inner thread 58 of hub 56.

Figure 4:
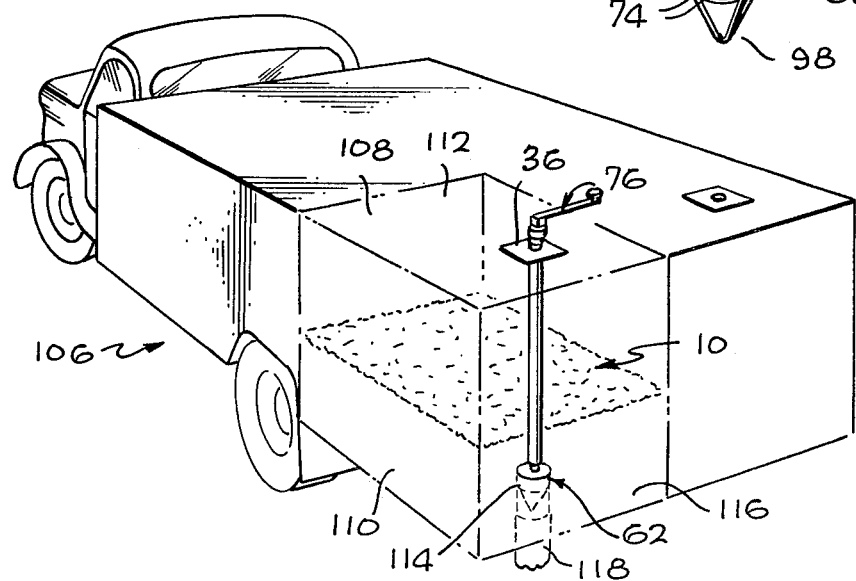
FIG. 4 illustrates the dump valve assembly of the invention incorporated in a lavatory service trunk.

FIG. 4 shows, by way of example, a lavatory service truck 106 incorporating the dump valve assembly 10 according to the invention. The truck 106 is seen to comprise a sewage holding tank 108 containing waste contents 110. The assembly 10 extends in a vertical plane with the mounting plate 36 secured to the top 112 of the tank. The plug 36, as shown, is positioned within the outlet 114 at the bottom 116 of the tank and fluid-tightly seals the outlet. Since holding tank 108 is not being emptied, handle assembly 76 is in the horizontal position and shaft 17 is not raised to its elevated position. For purposes of illustration only, a waste tank dump hose 118 is shown as being connected to outlet 114 by means of, for example, a nipple assembly, not shown, formed in bottom 116 of tank 108. The hose 118 serves to dump the waste from tank 108 in guided fashion at an improved disposal site.

While the invention has been shown and described in terms of a preferred embodiment, it will be obvious to those versed in the art that various substitutions, modifications, omissions, and changes may be made without departing from the scope of the invention.

What is claimed is:

1. A valve assembly, comprising:
a fixed outer tube;
an inner tube telescopically located within said fixed outer tube, said inner tube having an inner end and an outer end, a first plate being secured to said inner end of said inner tube;
a shaft movably located within said inner tube, said shaft having an outer end and an inner threaded end, said shaft being of a length greater than said inner tube, said outer end of said shaft being attached to handle means, said handle means being effective to facilitate manual grasping and movement of said shaft within said inner tube, a second plate being attached to said inner end of said shaft, movement of said shaft with respect to said inner tube causes a variation in the spacing between said first and said second plates;
a resilient expandable sealing means located between said first and second plates, said first and second plates being spaced so as to precompress said sealing means in its rest position, said sealing means is in the form of an annular donut-shaped plug, the latter having an exterior peripheral surface configured into a plurality of interconnected ribs, said ribs being adapted to provide a positive fluid-tight seal with the interior surface of a fluid conduit upon expansion of said sealing means within the said conduit; and
guiding means attached to said second plate, said guiding means being effective to facilitate the proper location of said sealing means within the fluid conduit, and said guiding means being in the form of an open, cage-type, substantially conical structure wherein the pointed end of said latter structure guides said sealing means into the desired position.

2. A valve assembly comprising:
a fixed outer tube;
an inner tube telescopically located within said fixed outer tube, said inner tube having an inner end and an outer end, a first plate being secured to said inner end of said inner tube;
a shaft movably located within said inner tube, said shaft having an outer end and an inner threaded end, said shaft being of a length greater than said inner tube, said outer end of said shaft being attached to handle means, said latter means being effective to facilitate manual grasping and movement of said shaft within said inner tube, a second plate being attached to said inner end of said shaft, movement of said shaft with respect to said inner tube causes a variation in the spacing between said first and second plates;
a resilient expandable sealing means located between said first and second plates, said first and second plates being spaced so as to precompress said sealing means in its rest position, said sealing means is in the form of an annular donut-shaped plug, the latter having an exterior peripheral surface configured into a plurality of interconnected ribs, said ribs being adapted to provide a positive fluid-tight seal with the interior surface of a fluid conduit upon expansion of said sealing means within the said conduit;
guiding means attached to said second plate, said guiding means being effective to facilitate the proper location of said sealing means within the fluid conduit, and said guiding means being in the form of an open, cage-type, substantially conical structure, the pointed end of which guides said sealing means into the desired position; and an annular interiorly threaded stud attached to said second plate and threadably adjustably mounted on said inner end of said shaft, rotation of the latter relative to said inner tube varies the spacing between said first and second plates and therefore affects expansion or contraction of said sealing means.

3. A valve assembly, comrpising:

a fixed outer tube;

an inner tube telescopically located within said fixed outer tube, said inner tube having an inner end and an outer end, a first plate being secured to said inner end of said inner tube;

a shaft movably located within said inner tube, said shaft having an outer end and an inner threaded end, said shaft being of a length greater than said inner tube, said outer end of said shaft being attached to handle means, said handle means being effective to facilitate manual grasping and movement of said shaft within said inner tube, a second plate being attached to the inner end of said shaft, movement of the latter with respect to said inner tube causes a variation in the spacing between said first and second plate;

a resilient expandable sealing means located between said first and second plates, said first and second plates being spaced so as to precompress said sealing means in its rest position, said latter means being in the form of an annular donut-shaped plug, said plug having an exterior peripheral surface configured into a plurality of interconnected ribs, said ribs providing a positive fluid-tight seal with the interior surface of a fluid conduit upon expansion of said sealing means within the said conduit;

an annular interiorly threaded stud attached to said second plate and threadably adjustably mounted on said inner end of said shaft, rotation of the latter relative to said inner tube varies the spacing between said first and second plates and therefore affects expansion or contraction of said sealing means; and, a washer assembly connected to said shaft at said inner end thereof, said washer assembly being effective to engage with said second plate, the greater the physical thickness of said washer assembly the closer said plate is located with respect to said first plate, thereby increasing the initial precompression of said sealing means.

4. A valve assembly, comprising:

a fixed outer tube;

an inner tube telescopically located within said fixed outer tube, said inner tube having an inner end and an outer end, a first plate being secured to said inner end of said inner tube;

a shaft movably located within said inner tube, said shaft having an outer end and an inner threaded end, said shaft being of a length greater than said inner tube, said outer end of said shaft being attached to handle means, said handle means being effective to facilitate manual grasping and movement of said shaft within said inner tube, a second plate being attached to the inner end of said shaft, movement of said shaft with respect to said inner tube causes a variation in the spacing between said first and second plate;

a resilient expandable sealing means located between said first and second plates, said first and second plates being spaced so as to precompress said sealing means in its rest position, said sealing means being in the form of an annular donut-shaped plug, said plug having an exterior peripheral surface configured into a plurality of interconnected ribs, said ribs providing a positive fluid-tight seal with the interior surface of a fluid conduit upon expansion of said sealing means within the said conduit; and interlocking means coupled between said inner tube and said outer tube, said interlocking means being capable of being engaged or disengaged, upon said interlocking means being engaged said inner tube being fixedly connected to said outer tube preventing rotary motion therebetween, therefore upon rotary motion of said shaft, the spacing between said first and second plates is varied.

5. The valve assembly as defined in claim 4 wherein: said interlocking means comprises a depending finger member attached to said inner tube which is locatable within a slot formed within said outer tube.

* * * * *